United States Patent Office 3,491,028
Patented Jan. 20, 1970

3,491,028
CHLORINE STABLE MACHINE DISHWASHING COMPOSITION
Homer E. Crotty, Cincinnati, Ohio, and Charles A. Brungs, Covington, Ky., assignors to W. R. Grace & Co., New York, N.Y., a corporation of Connecticut
No Drawing. Continuation-in-part of application Ser. No. 525,386, Feb. 7, 1966. This application June 3, 1969, Ser. No. 830,105
Int. Cl. C11d 7/56, 7/16
U.S. Cl. 252—103           8 Claims

ABSTRACT OF THE DISCLOSURE

A chlorine stable machine dishwashing composition is disclosed consisting of (A) an inorganic alkaline material in major amount, and (B) a chlorinating agent chosen from the group consisting of lithium hypochlorite and a mixture of lithium hypochlorite and sodium or potassium dichlorocyanurate.

---

This application is a continuation-in-part of U.S. application Ser. No. 525,386, filed Feb. 7, 1966, now abandoned.

The present invention relates to a highly alkaline chlorine stable dishwashing composition. More particularly, the present invention is directed to a chlorine stable composition composed of (A) an alkaline material in major amount; and (B) a chlorinating agent selected from the group consisting of lithium hypochlorite alone, or lithium hypochlorite in combination with sodium or potassium dichlorocyanurate. The alkaline material may be an alkaline builder, or a combination of an alkaline builder and a caustic material. The alkaline builder is chosen from builder salts comprising anhydrous alkali metal phosphates wherein the ratio of $Me_2O$ to $P_2O_5$ is from 1 to 3:1, Me being sodium or potassium with representative materials including sodium tripolyphosphate, tetrasodium pyrophosphate, tetrapotassium pyrophosphate, sodium or potassium orthophosphate, sodium hexametaphosphate, and various combinations thereof; an anhydrous solid water soluble alkali metal silicate wherein the ratio of $SiO_2$ to $Me_2O$ is 0.5 to 3.75:1, Me being sodium or potassium with representative materials including sodium meta silicate, sodium sesquisilicate, sodium orthosilicate, potassium metasilicate, sodium carbonate, and various combinations thereof. The caustic material is either sodium or potassium hydroxide. In addition to the major components, the present composition may contain small amounts of such well-known detergency enhancers as sodium sulfate and sodium chloride, and of adsorbents such as magnesium silicate and hydrated silica oxide.

It has been known in formulating machine dishwashing compositions to use various combinations of inorganic builder salts such as polyphosphates, metasilicates, and carbonates combined with caustic materials such as sodium hydroxide. When sodium orthosilicate is used as a builder salt, there is no need to add the caustic material since the orthosilicate functions as alkaline builder while supplying an alkaline value. It is only necessary for caustic to be used when silicates other than the orthosilicate are employed.

It is well known that dishwashing compounds containing a chlorinating agent have the advantage of reducing food stains by releasing oxygen which bleaches various stains, such as those of coffee and juices. Chlorinating agents have been observed to release stains of blood, agar and certain chemical residues in cleaning laboratory glassware. These agents improve rinsability and reduce water spotting of hard water salts while frequently removing the last trace of soils which are not readily removed by other detergents. Chlorinating agents have also proven to be effective sanitizers when used in sufficient strength.

A disadvantage of chlorine-containing dishwashing compositions has been that in order to maintain chlorine stability, the compositions must contain low amounts of caustic material to avoid decomposition of the chlorinating agent. In many cases the low alkaline containing compositions do not remove heavy deposits of grease or starch materials.

The prior art has proposed potassium dichlorocyanurate for use as a chlorinating agent which although in a highly alkaline composition, was found to be stable in storage. However, the combination of high alkalinity and the dichlorocyanurate has shown very rapid losses of available chlorine in the dishwashing machine, and premature release of available chlorine in dispensing equipment where it was added to water or when water was added to the dry product. The violent boiling action produced by premature chlorine release is dangerous from a personnel standpoint and in frequent cases produces a strong chlorine ordor in kitchen and food handling areas.

It has now been found that by the practice of the present invention there is provided a chlorine stable machine dishwashing composition containing specific alkaline materials and a specific chlorinating agent together with conventional builder salts, the chlorinating agent being blended with the other components. A preferred embodiment of this invention provides a chlorine stable machine dishwashing composition which contains sodium orthosilicate and lithium hypochlorite together with conventional builder salts. In another preferred embodiment the chlorine stable compositions contains caustic, sodium metasilicate and a combination of lithium hypochlorite and sodium dichlorocyanurate. In yet another embodiment, the chlorine stable composition contains sodium metasilicate, caustic, and lithium hypochlorite. The composition of this invention provides good cleaning qualities of both chlorine and caustic, and has unexpectedly superior cleaning efficiency over presently known chlorine containing machine dishwashing compositions.

The bleaching ability and stability of lithium hypochlorite in highly alkaline solutions has proven to be effective in tests performed in restaurant dishwashing machines. Continuous use of 0.2% concentration of the present composition has been effective for complete removal of greases, starches, protein foods, and coffee and food stains. Moreover, those compositions which derive active chlorine from either lithium hypochlorite alone or a combination of lithium hypochlorite and sodium or potassium salts of dichlorocyanuric acid showed excellent performance with the added advantages of exceptionally high stability of active chlorine during long storage in closed containers. These compositions have shown the additional advantage of sufficiently slow chlorine release to prevent a violent reaction when added to water in dispensers. The active chlorine is more slowly delivered to the wash section of automatic dishwashing machines.

It is necessary to employ in the present composition, a granular form of the dichlorocyanurate in order to obtain chlorine stable compositions. When a particle size distribution of 95% by weight through U.S. Standard Screen No. 80 and 80% by weight through U.S. Standard Screen No. 100 is employed, the resulting composition is not sufficiently chlorine stable for commercial purposes. On the other hand, when comparatively large particles are used there is not sufficiently rapid dissolution and release of available chlorine upon charging to the dishwashing machine. This particularly so in home dishwashing machines when there is retention of the composition for only one cycle. For efficient operation, available chlorine must be released soon after introduction of the detergent composition into such a machine. Thus, granular potassium or sodium dichlorocyanurate having a particle size primarily at least about 60% by weight, passing through U.S. Standard Screen No. 20 and retained on U.S. Standard Screen No. 50 is used in the composition of this invention. The specific limits of particle size distribution which have been found to be especially effective are 15% by weight on No. 20 and 10% by weight through No. 50. This granular form of potassium or sodium dichlorocyanurate is commercially available.

In formulating the present chlorine stable composition, it is essential that all the ingredients be kept as dry as possible prior to mixing. The ingredients should be of anhydrous grade taken from sealed containers, charged directly to a mixer such as a conventional commercial ribbon mixer, and further mixed for a total period of about 3 minutes and then packed immediately into sealed containers.

The alkaline builder phosphate material component of the present composition generally is present in an amount from about 20 to about 70 parts by weight of the final composition, and the alkaline builder silicate material generally is present in an amount from about 5 to about 50 parts by weight of the final composition. Sodium carbonate may be used to replace up to about 40% of the combined phosphate and silicate materials. Thus, sodium carbonate may be present in an amount from 0 up to about 35 parts by weight of the final composition. The caustic material generally is present from about 5 to about 30 parts by weight of the final composition while the lithium hypochlorite is present in an amount from about 0.5 to about 20 parts by weight of the final composition, and the sodium or potassium dichlorocyanurate is present from about 0.5 to about 3 parts by weight of the final composition. A combined chlorinating agent of lithium hypochlorite and sodium dichlorocyanurate forms from about 1.0 to about 23 parts by weight of the final composition.

Preferably, the alkaline builder phosphate material is present in an amount from about 40 to about 70 parts by weight, the alkaline builder silicate material is in an amount from about 20 to about 30 parts by weight, the caustic material forms from about 5 to about 30 parts by weight, and the chlorinating agent forms from about 1 to about 23 parts by weight of the final composition. In selecting the various components for a machine dishwashing formulation, it is further preferred that the phosphate material be sodium tripolyphosphate or tetrasodium pyrophosphate; the silicate material be sodium metasilicate; the caustic material be sodium hydroxide; and the dichlorocyanurate be the sodium salt. In a preferred embodiment, the phosphate material may be sodium tripolyphosphate or tetrasodium pyrophosphate; the alkaline silicate material may be sodium orthosilicate; and the chlorinating material may be lithium hypochlorite.

The following examples illustrate in greater detail practice of the present invention. In all examples, the sodium dichlorocyanurate was a commercial granular product having a U.S. Standard Screen analysis of 15 percent on No. 20 and 10 percent through No. 50. All of the components used were essentially anhydrous.

EXAMPLE 1

A machine dishwashing formulation was prepared having the following composition with amounts indicated:

| Ingredients: | Parts by weight |
|---|---|
| Sodium tripolyphosphate | 45.0 |
| Tetrasodium pyrophosphate | 15.0 |
| Sodium metasilicate, anhydrous | 20.0 |
| Sodium carbonate | 8.0 |
| Sodium hydroxide | 7.0 |
| Lithium hypochlorite | 4.0 |
| Sodium dichlorocyanurate | 1.0 |

The above ingredients were added to a laboratory powder mixer in the order shown above and mixed together for 3 minutes. The mixture was then stored in a sealed glass jar.

EXAMPLE 2

A machine dishwashing formulation was prepared having the following composition with amounts indicated:

| Ingredients: | Parts by weight |
|---|---|
| Sodium tripolyphosphate | 21.0 |
| Tetrasodium pyrophosphate | 21.0 |
| Sodium metasilicate, anhydrous | 19.0 |
| Sodium carbonate | 19.0 |
| Sodium hydroxide | 15.0 |
| Lithium hypochlorite | 4.0 |
| Sodium dichlorocyanurate | 1.0 |

The above ingredients were added to a laboratory powder mixer in the order shown above and mixed together for 3 minutes. The mixture was then stored in a sealed glass jar.

EXAMPLE 3

A machine dishwashing formulation was prepared having the following composition with amounts indicated:

| Ingredients: | Parts by weight |
|---|---|
| Sodium tripolyphosphate | 35.0 |
| Tetrasodium pyrophosphate | 18.0 |
| Sodium carbonate | 8.5 |
| Sodium chloride | 2.0 |
| Hydrated $SiO_2$ | 0.5 |
| Sodium orthosilicate | 30.0 |
| Lithium hypochlorite | 6.0 |

The above ingredients were added to a laboratory powder mixer in the order shown above and mixed together for 3 minutes. The mixture was then stored in a glass jar.

EXAMPLE 4

A machine dishwashing formulation was prepared having the following composition with amounts indicated:

| Ingredients: | Parts by weight |
|---|---|
| Sodium tripolyphosphate | 35.0 |
| Tetrasodium pyrophosphate | 25.0 |
| Sodium hexametaphosphate | 6.0 |
| Sodium orthosilicate | 20.0 |
| Lithium hypochlorite | 14.0 |

The above ingredients were added to a laboratory powder mixer together for 3 minutes. The mixture was then stored in a sealed jar.

EXAMPLE 5

A machine dishwashing formulation was prepared having the following composition with amounts indicated:

| Ingredients: | Parts by weight |
|---|---|
| Sodium tripolyphosphate | 25.5 |
| Tetrasodium pyrophosphate | 10.0 |
| Sodium carbonate | 19.7 |
| Sodium metasilicate, anhydrous | 25.5 |
| Sodium hydroxide | 15.0 |
| Lithium hypochlorite | 4.3 |

The above ingredients were added to a laboratory mixer in the order shown above and mixed together for 3 minutes. The mixture was then stored in a glass jar.

EXAMPLE 6

A control formulation of the prior art was prepared having the following composition with amounts indicated:

| Ingredients: | Parts by weight |
|---|---|
| Tetrasodium pyrophosphate | 21.0 |
| Sodium tripolyphosphate | 21.0 |
| Sodium metasilicate, anhydrous | 20.0 |
| Sodium carbonate | 14.6 |
| Sodium hydroxide | 20.0 |
| Potassium dichlorocyanurate | 3.4 |

The above ingredients were added to a laboratory powder mixer in the order shown above and mixed together for 3 minutes. The mixture was then stored in a sealed glass jar.

EXAMPLE 7

In order to determine the comparative bleaching ability of various compositions having highly alkaline formula, the following dry mix was made and compared with the formulations in Examples 1 through 6. This dry mix is indicative of presently available commercial dishwashing compositions, and contains:

| Ingredients: | Parts by weight |
|---|---|
| Sodium tripolyphosphate | 20 |
| Sodium carbonate | 15 |
| Anhydrous sodium metasilicate | 15 |
| Chlorinated trisodium phosphate (TSP) | 50 |

The above ingredients were added together and mixed for 3 minutes.

The testing procedure to determine bleaching ability was as follows:

New plastic cups were stained by boiling in a solution containing 1.73% by weight instant coffee for 20 hours. The resulting stain was a uniform deep tan. Some of the stained cups were soaked in a 0.6% weight percent solution of the above chlorinated detergent formulae for 2½ hours at 140° F., then rinsed and dried. The comparative bleaching effect of the compositions was compared with a Photovolt Reflectometer. The flat surface of the unstained cups was used as the standard for 100% reflectance setting. The flat surface of the stained cups was used for the 0% reflect in setting. The average reflectance readings of the stained and the reflectance of the same cups soaked in the various bleaching solutions were as follows:

TABLE I

| Bleaching Agent | Stained Cups, percent | Bleached Cups, percent | Percent Bleached |
|---|---|---|---|
| Example 1 LiOCl plus Na dichlorocyanurate | 8.3 | 63 | 55 |
| Example 2 LiOCl plus Na dichlorocyanurate | 8.5 | 59 | 50 |
| Example 3 LiOCl | 8.2 | 58 | 50 |
| Example 4 LiOCl | 8.6 | 59 | 50 |
| Example 5 LiOCl | 8.5 | 61 | 52 |
| Example 6 K dichlorocyanurate | 8.0 | 55 | 47 |
| Example 7 Chlorinated TSP | 9.0 | 55 | 46 |

It is apparent from the above that the compositions of Examples 1 through 5 are effective bleaches in comparison with that of the prior art compositions.

The compositions of Examples 1 through 7 were run in a dishwashing machine at 0.2% concentration at 160° F. to determine the type of formulation which would deliver the most uniform and constant percentage of available chlorine. Table II presents the results of this determination. While the formula containing chlorinated trisodium phosphate showed good bleaching, in this type of application it showed poor stability in the dishwashing machine. The formula containing high alkalinity and potassium dichlorocyanurate alone showed very rapid loss of available chlorine in the dishwashing machine, while releasing available chlorine as soon as dispensed and when water was added to the dry product. The compositions of Examples 1 and 2 containing lithium hypochlorite in combination with dichlorocyanurate, and of Examples 3, 4 and 5 containing lithium hypochlorite did not release chlorine as rapidly in the dispensing equipment.

TABLE II

| Example | Initial p.p.m.[1] Available Chlorine | P.p.m. Chlorine Available After— | | |
|---|---|---|---|---|
| | | 1 Hour[1] | 2 Hours[1] | Standing Overnight[1] |
| 1 | 70.0 | 50.0 | 30.0 | 28.0 |
| 2 | 64.0 | 48.0 | 29.0 | 27.0 |
| 3 | 39.0 | 38.4 | 38.0 | 22.0 |
| 4 | 121.6 | 95.2 | 85.6 | 38.8 |
| 5 | 27.8 | 27.0 | 24.8 | 19.5 |
| 6 | 63.0 | 30.0 | 15.0 | 13.0 |
| 7 | 67.0 | 26.0 | 14.0 | 11.0 |

[1] P.p.m. means parts per million by weight.

Chlorine stability of dry mixes was examined because it is very important that the dry mixes of high alkaline chlorinated detergents retain the active chlorine content over long periods of storage. In the available chlorine stability tests on dry mixes, 10 gram samples were kept at a temperature of 98° F. for up to 2 months before duplicate or triplicate testing using a standard analytical method for determination of available chlorine.

The dry mix containing caustic and chlorinated TSP of Example 7 was very unstable, losing between 40 and 60% of its total available chlorine within 1 to 2 days storage, even under extremely dry storage conditions.

A similar study was made of other dry mixes of Examples 1–6. It was observed that dry mixes which contained a combination of lithium hypochlorite and salts of dichlorocyanuric acid showed no drop in available chlorine when stored in sealed containers for 8 weeks storage. The compositions with lithium hypochlorite as the sole chlorinating agent also showed no drop in available chlorine release in 8 weeks storage. The compositions with dichlorocyanurate as the sole chlorinating agent lost approximately 5–10% of its available chlorine in storage.

What is claimed is:

1. A chlorine stable machine dishwashing composition consisting of:
   (A) inorganic alkaline material in an amount from about 20 to about 70 parts by weight; and
   (B) a chlorinating agent selected from the group consisting of lithium hypochlorite and a mixture of lithium hypochorite and sodium or potassium dichlorocyanurate particles having a size at least 60% of which pass a No. 20 USS and are retained on a No. 50 USS; said lithium hypochlorite being present in an amount from about 0.5 to about 20 parts by weight and said sodium or potassium dichlorocyanurate being present in an amount from about 0.5 to about 3 parts by weight, said mixture being present in an amount of about 1.0 to about 23 parts by weight.

2. The chlorine stable composition of claim 1 wherein the inorganic alkaline material is an alkaline builder being a combination of:

(A) from about 20 to about 70 parts by weight of at least one alkali metal phosphate wherein the ratio $Me_2O$ to $P_2O_5$ is from 1 to 3:1, Me being selected from the class consisting of sodium and potassium;

(B) from about 5 to about 50 parts by weight of sodium ortho silicate; and (C) from about 0 to about 35 parts by weight of sodium carbonate.

3. The chlorine stable detergent composition of claim 2 wherein the alkali metal phosphate is a mixture of sodium tripolyphosphate and tetrasodium pyrophosphate.

4. The chlorine stable composition of claim 1 wherein the inorganic alkaline material is a combination of:

(A) from about 20 to about 70 parts by weight of at least one alkali metal phosphate wherein the ratio $Me_2O$ to $P_2O_5$ is from 1 to 3:1, Me being selected from the class consisting of sodium and potassium;

(B) from about 5 to about 50 parts by weight based on the final composition of an alkali metal silicate selected from the group consisting of sodium metasilicate, sodium sesquisilicate, and potassium metasilicate;

(C) from about 0 to about 35 parts by weight based on the final composition of sodium carbonate; and (D) from about 5 to about 30 parts by weight based on final composition of a caustic selected from the group consisting of sodium hydroxide and potassium hydroxide.

5. The chlorine stable composition of claim 4 wherein the alkali metal phosphate is a mixture of sodium tripolyphosphate and tetrasodium pyrophosphate; the alkali metal silicate is sodium metasilicate; and the caustic material is sodium hydroxide.

6. A chlorine stable composition consisting essentially of 45 parts by weight of sodium tripolyphosphate, 15 parts by weight tetrasodium pyrophosphate, 20 parts by weight sodium metasilicate, 8 parts by weight sodium carbonate, 7 parts by weight sodium hydroxide, 4 parts by weight lithium hypochlorite and 1 part by weight sodium dichlorocyanurate, said sodium dichlorocyanurate having a particle size distribution of about 15% by weight retained on U.S. Standard Screen No. 20 and about 10% by weight through U.S. Standard Screen No. 50.

7. A stable detergent composition consisting essentially of 35 parts by weight of sodium tripolyphosphate, 25 parts by weight tetrasodium pyrophosphate, 6 parts by weight sodium hexametaphosphate, 20 parts by weight sodium orthosilicate, and 14 parts by weight lithium hypochlorite.

8. The chlorine stable composition of claim 4 wherein the inorganic alkaline material is present in an amount from about 40 to about 70 parts by weight, the alkali metal silicate is present in an amount from about 20 to about 30 parts by weight, the caustic is present in an amount from about 5 to about 30 parts by weight, and lithium hypochlorite is present in an amount from about 1 to about 23 parts by weight.

References Cited

UNITED STATES PATENTS

| | | | |
|---|---|---|---|
| 3,054,753 | 9/1962 | Hurt et al. | 252—99 |
| 3,166,513 | 1/1965 | Mizuno et al. | 252—99 |
| 3,306,858 | 2/1967 | Oberle | 252—99 |
| 3,346,502 | 10/1967 | Wixon | 252—95 XR |
| 3,352,785 | 11/1967 | Corliss et al. | 252—99 |

MAYER WEINBLATT, Primary Examiner